(12) United States Patent
Kumazawa

(10) Patent No.: US 11,187,294 B2
(45) Date of Patent: Nov. 30, 2021

(54) FRICTION MEMBER, FRICTION MATERIAL COMPOSITION, FRICTION MATERIAL, AND VEHICLE

(71) Applicant: SHOWA DENKO MATERIALS CO., LTD., Tokyo (JP)

(72) Inventor: Akira Kumazawa, Tokyo (JP)

(73) Assignee: SHOWA DENKO MATERIALS CO., LTD., Tokyo (JP)

(*) Notice: Subject to any disclaimer, the term of this patent is extended or adjusted under 35 U.S.C. 154(b) by 52 days.

(21) Appl. No.: 16/554,663

(22) Filed: Aug. 29, 2019

(65) Prior Publication Data

US 2021/0062883 A1    Mar. 4, 2021

(51) Int. Cl.
*F16D 69/02* (2006.01)
*F16D 69/04* (2006.01)

(52) U.S. Cl.
CPC ............ *F16D 69/026* (2013.01); *F16D 69/04* (2013.01); *F16D 2069/0466* (2013.01); *F16D 2200/003* (2013.01); *F16D 2200/0013* (2013.01); *F16D 2200/0021* (2013.01); *F16D 2200/0047* (2013.01); *F16D 2200/0052* (2013.01); *F16D 2200/0065* (2013.01); *F16D 2200/0069* (2013.01)

(58) Field of Classification Search
CPC ........... F16D 69/026; F16D 2200/0065; F16D 2200/0069; F16D 2200/0052; F16D 2069/0466; F16D 2200/0013; F16D 2200/0021; F16D 2200/003; F16D 2200/0047; F16D 69/04
See application file for complete search history.

(56) References Cited

U.S. PATENT DOCUMENTS

| | | | |
|---|---|---|---|
| 7,740,698 B2 * | 6/2010 | Kitami | F16D 69/026 106/36 |
| 10,670,099 B2 * | 6/2020 | Yaguchi | F16D 69/026 |
| 2015/0192182 A1 * | 7/2015 | Yamamoto | F16D 69/026 523/157 |
| 2016/0069408 A1 * | 3/2016 | Hattori | F16D 69/026 523/156 |
| 2016/0289126 A1 * | 10/2016 | Kitami | C04B 35/80 |
| 2017/0234390 A1 * | 8/2017 | Kaji | F16D 69/026 523/156 |
| 2019/0107164 A1 * | 4/2019 | Sun | F16D 69/026 |
| 2019/0360544 A1 * | 11/2019 | Santamaria Razo | F16D 65/125 |
| 2019/0376573 A1 * | 12/2019 | Koike | F16D 69/028 |
| 2020/0032869 A1 * | 1/2020 | Kaji | F16D 65/092 |
| 2020/0308461 A1 * | 10/2020 | Mitsumoto | C08K 3/013 |

FOREIGN PATENT DOCUMENTS

| | | | |
|---|---|---|---|
| JP | 2003322183 A | | 11/2003 |
| JP | 2004155843 A | * | 6/2004 |
| JP | 2018135446 A | * | 8/2018 |

* cited by examiner

*Primary Examiner* — Pamela Rodriguez
(74) *Attorney, Agent, or Firm* — Wenderoth, Lind & Ponack, L.L.P.

(57) ABSTRACT

The present invention relates to a friction member comprising a friction material and a back metal, wherein the friction material comprises no copper, or has a copper content of less than 0.5% by mass in terms of a copper element even if the friction material comprises copper, the friction material comprises magnesium oxide and a carbon material comprising graphite and coke, the carbon material is obtained by blending in a combination of a coarse-grained material and a fine-grained material, an average particle diameter of the coarse-grained material is 100 to 600 μm, and an average particle diameter of the fine-grained material is less than 100 μm.

12 Claims, No Drawings

FRICTION MEMBER, FRICTION MATERIAL COMPOSITION, FRICTION MATERIAL, AND VEHICLE

FIELD OF THE INVENTION

The present invention relates to a friction member, a friction material composition, a friction material, and a vehicle.

BACKGROUND OF THE INVENTION

In vehicles such as motor vehicles, friction materials such as disk brake pads and brake linings are used for braking. The friction materials serve the function of braking by producing friction with facing materials such as disk rotors and brake drums. Therefore, a good friction coefficient, good abrasion resistance (the life of friction materials being long), good strength, good sound and vibration properties (brake squeal and an abnormal sound being less likely to occur), and the like are required of the friction materials. In addition, the friction coefficient is required to be stable regardless of vehicle speed, deceleration, and brake temperature.

Conventionally, as the friction materials, those containing powder or fiber copper have been common. But, in recent years, copper used in friction materials has been suspected to scatter as abrasion powders of brakes to cause the contamination of rivers, lakes, seas, and the like, and the movement to limit the amount of copper used in friction materials has increased.

Copper is a component that is blended into friction materials in the form of fibers and powder and is effective in providing thermal conductivity and improving abrasion resistance. Problems of a composition in which no copper is contained are that the thermal conductivity decreases, and therefore heat at a friction interface does not diffuse during braking at high temperature, and the amount of abrasion of the friction material increases, and a fade phenomenon occurs due to decomposed gas. Therefore, when copper is only simply removed, the thermal conduction decreases, and due to a decrease in the friction coefficient and the deterioration of the abrasion resistance during high temperature braking, the applicable vehicle types are limited.

In such a movement to limit the use of copper, a method of adding graphite and magnesium oxide having high thermal conduction, in order to improve thermal conductivity and abrasion resistance in a friction material composition containing no copper is proposed (see PTL1).

CITATION LIST

Patent Literature

PTL1: JP 2003-322183 A

SUMMARY OF THE INVENTION

Technical Problem

However, in the technique of PTL1, the addition of a large amount of graphite is necessary, thereby causing a decrease in the friction coefficient, which may impair braking performance, an important characteristic of a brake.

The present invention has been made in view of the above circumstances and provides a friction member having a friction material that has high thermal conductivity, is excellent in abrasion resistance during high temperature braking, and ensures a good friction coefficient during fade, even in a composition in which the friction material contains no copper suspected to be environmentally harmful, or has a copper content of less than 0.5% by mass in terms of a copper element even if the friction material contains copper, a friction material composition that can provide the friction material, the friction material, a vehicle equipped with the friction member, and a method for producing the friction material composition.

Solution to Problem

The present inventors have studied diligently over and over in order to solve the above problem, and as a result found that the above problem can be solved by the present invention below, and completed the present invention.

Specifically, the present invention relates to the following [1] to [21].

[1] A friction member comprising a friction material and a back metal, wherein
the friction material comprises no copper, or has a copper content of less than 0.5% by mass in terms of a copper element even if the friction material comprises copper,
the friction material comprises magnesium oxide and a carbon material comprising graphite and coke,
the carbon material is obtained by blending in a combination of a coarse-grained material and a fine-grained material,
an average particle diameter of the coarse-grained material is 100 to 600 μm, and
an average particle diameter of the fine-grained material is less than 100 μm.

[2] The friction member according to the above [1], wherein a total content of the graphite and the coke in the friction material is 4 to 15% by mass based on a total amount of the friction material.

[3] The friction member according to the above [1], wherein a content ratio of the coarse-grained material to the fine-grained material [coarse-grained material/fine-grained material] in the friction material is 10/90 to 95/5 on a mass basis.

[4] The friction member according to the above [1], wherein the friction material
comprises the graphite as the coarse-grained material, and
comprises the coke as the fine-grained material.

[5] The friction member according to the above [1], wherein the friction material
comprises the graphite and the coke as the coarse-grained material, and
comprises the coke as the fine-grained material,
a content of the coarse-grained material of the graphite is 1 to 12% by mass based on a total amount of the friction material,
a content of the coarse-grained material of the coke is 1 to 12% by mass based on the total amount of the friction material,
a content of the fine-grained material of the coke is 1 to 12% by mass based on the total amount of the friction material, and
a total content of the graphite and the coke is 4 to 15% by mass based on the total amount of the friction material.

[6] The friction member according to the above [1], wherein a content of the magnesium oxide in the friction material is 3 to 13% by mass based on a total amount of the friction material.

[7] The friction member according to the above [1], wherein the friction material further comprises 2 to 10% by mass of zinc oxide based on a total amount of the friction material.

[8] A vehicle equipped with the friction member according to the above [1].

[9] A friction material composition comprising no copper, or having a copper content of less than 0.5% by mass in terms of a copper element even if the friction material composition comprises copper, wherein the friction material composition comprises magnesium oxide and a carbon material comprising graphite and coke, the carbon material is obtained by blending in a combination of a coarse-grained material and a fine-grained material, an average particle diameter of the coarse-grained material is 100 to 600 μm, and an average particle diameter of the fine-grained material is less than 100 μm.

[10] The friction material composition according to the above [9], wherein a total content of the graphite and the coke is 4 to 15% by mass based on a total amount of the friction material composition.

[11] The friction material composition according to the above [9], wherein a content ratio of the coarse-grained material to the fine-grained material [coarse-grained material/fine-grained material] is 10/90 to 95/5 on a mass basis.

[12] The friction material composition according to the above [9], comprising the graphite as the coarse-grained material, and comprising the coke as the fine-grained material.

[13] The friction material composition according to the above [9], comprising the graphite and the coke as the coarse-grained material, and comprising the coke as the fine-grained material, wherein a content of the coarse-grained material of the graphite is 1 to 12% by mass based on a total amount of the friction material composition, a content of the coarse-grained material of the coke is 1 to 12% by mass based on the total amount of the friction material composition, a content of the fine-grained material of the coke is 1 to 12% by mass based on the total amount of the friction material composition, and a total content of the graphite and the coke is 4 to 15% by mass based on the total amount of the friction material composition.

[14] The friction material composition according to the above [9], wherein a content of the magnesium oxide is 3 to 13% by mass based on a total amount of the friction material composition.

[15] The friction material composition according to the above [9], further comprising 2 to 10% by mass of zinc oxide based on a total amount of the friction material composition.

[16] A friction material comprising the friction material composition according to the above [9].

[17] A method for producing a friction material composition comprising no copper, or having a copper content of less than 0.5% by mass in terms of a copper element even if the friction material composition comprises copper, wherein the friction material composition comprises magnesium oxide and a carbon material comprising graphite and coke, the carbon material is obtained by blending in a combination of a coarse-grained material and a fine-grained material, an average particle diameter of the coarse-grained material is 100 to 600 μm, and an average particle diameter of the fine-grained material is less than 100 μm, the method comprising a step of mixing the magnesium oxide, graphite, and coke.

[18] A friction material composition comprising no copper, or having a copper content of less than 0.5% by mass in terms of a copper element even if the friction material composition comprises copper, wherein the friction material composition comprises magnesium oxide and a carbon material comprising graphite and coke, the carbon material has two or more peaks in a particle diameter distribution curve showing a volume-based frequency distribution, and the two or more peaks comprise a first peak having a maximum in the range of 100 to 600 μm, and a second peak having a maximum in the range of less than 100 μm.

[19] A friction material comprising the friction material composition according to the above [18].

[20] A friction member comprising the friction material according to the above [19] and a back metal in this order.

[21] A vehicle equipped with the friction member according to the above [20].

Advantageous Effects of Invention

According to the present invention, it is possible to provide a friction member having a friction material that has high thermal conductivity, is excellent in abrasion resistance during high temperature braking, and ensures a good friction coefficient during fade, even in a composition in which the friction material contains no copper suspected to be environmentally harmful, or has a copper content of less than 0.5% by mass in terms of a copper element even if the friction material contains copper, a friction material composition that can provide the friction material, the friction material, a vehicle equipped with the friction member, and a method for producing the friction material composition.

DESCRIPTION OF EMBODIMENTS

The friction member, the friction material composition, the friction material, and the vehicle in this embodiment will be described in detail below.

[Friction Member]

The friction member in this embodiment is a friction member having a friction material and a back metal, wherein the friction material contains no copper, or has a copper content of less than 0.5% by mass in terms of a copper element even if the friction material contains copper, the friction material contains magnesium oxide and a carbon material comprising graphite and coke, the carbon material is obtained by blending in a combination of a coarse-grained material and a fine-grained material, the average particle diameter of the coarse-grained material is 100 to 600 μm, and the average particle diameter of the fine-grained material is less than 100 μm.

The members constituting the friction member in this embodiment will be described below.

<Friction Material>

By having the above configuration, the friction material of the friction member in this embodiment has high thermal conductivity, is excellent in abrasion resistance during high temperature braking, and ensures a good friction coefficient during fade, even in a composition in which the friction material contains no copper, or has a copper content of less than 0.5% by mass in terms of a copper element even if the friction material contains copper. This is presumed to be because the magnesium oxide, graphite, and coke contained in the friction material in this embodiment are all substances having high thermal conductivity and therefore, instead of copper, can diffuse heat generated at a friction interface during braking at high temperature, to prevent an increase in the amount of abrasion of the friction material, and friction coefficient decrease due to a fade phenomenon due to decomposed gas.

Further, when the carbon material comprising graphite and coke is obtained by blending in a combination of a coarse-grained material and a fine-grained material, the friction material of the friction member in this embodiment has even higher thermal conductivity and even better abrasion resistance. Graphite and coke can both improve the abrasion resistance of a friction material as they become coarser-grained materials. But, as they become coarser-grained materials, thermal conduction paths are locally formed, and therefore it is difficult to improve the thermal conductivity of the entire friction material. On the other hand, in this embodiment, it is presumed that by further applying a fine-grained material, thermal conduction paths can be formed in the entire region to effectively improve the thermal conductivity of the entire friction material.

Next, the components contained in the friction material of the friction member in this embodiment will be described.
(Copper Content)

The friction material contains no copper, or has a copper content of less than 0.5% by mass, preferably 0.2% by mass or less, and more preferably 0.05% by mass or less in terms of a copper element even if the friction material contains copper. When the copper content is within the above range, there is no possibility that rivers, lakes, seas, and the like are contaminated with an abrasion powder generated during braking. The copper content represents the content of the copper element (Cu) contained in copper, a copper alloy, and a copper compound in a fibrous or powdery form or the like, in the entire friction material.
(Asbestos Content)

The friction material is classified into a NAO (Non-Asbestos-Organic) material and is the so-called non-asbestos friction material (a friction material containing no asbestos, or a friction material having an extremely slight asbestos content even when it contains asbestos). The friction material preferably contains no asbestos, but when the friction material contains asbestos, its content is preferably 0.2% by mass or less based on the total amount of the friction material.
(Inorganic Fillers)

The friction material in this embodiment contains, as inorganic fillers, magnesium oxide and a carbon material comprising graphite and coke. These are all substances having high thermal conductivity and, instead of copper, diffuse heat generated at a friction interface during braking at high temperature, to prevent an increase in the amount of abrasion of the friction material and nonuniform temperature increase to suppress the occurrence of brake vibration.

In this embodiment, the inorganic fillers do not include those having a fibrous shape (for example, the inorganic fibers described later).
[Carbon Material]

The carbon material comprises graphite and coke and is obtained by blending in a combination of a coarse-grained material and a fine-grained material.

The average particle diameter of the above coarse-grained material is 100 to 600 μm, preferably 100 to 550 μm, more preferably 150 to 500 μm, further preferably 200 to 450 μm, and particularly preferably 250 to 400 μm from the viewpoint of providing high thermal conductivity and excellent abrasion resistance to the friction material.

The average particle diameter of the above fine-grained material is less than 100 μm, preferably less than 90 μm, more preferably less than 50 μm, further preferably less than 30 μm, and particularly preferably less than 10 μm from the viewpoint of providing high thermal conductivity and excellent abrasion resistance to the friction material. The average particle diameter of the above fine-grained material may be 1 μm or more, or 2 μm or more.

An average particle diameter in this embodiment can be measured using a method such as laser diffraction particle size distribution measurement, and can be obtained, for example, as a particle diameter at a point corresponding to a volume of 50% in a cumulative frequency distribution curve of particle diameters in which the total volume of particles is 100%. For example, an average particle diameter in this embodiment can be measured by a laser diffraction/scattering particle diameter distribution measuring apparatus, trade name: LA-920 (manufactured by HORIBA, Ltd.). An average particle diameter in this embodiment can also be measured by sieve classification typified by JIS B 4130 and the like.

The content ratio of the coarse-grained material to the fine-grained material [coarse-grained material/fine-grained material] is preferably 10/90 to 95/5, more preferably 40/60 to 90/10, further preferably 60/40 to 85/15, and particularly preferably 70/30 to 80/20 on a mass basis from the viewpoint of providing high thermal conductivity and excellent abrasion resistance to the friction material.

The total content of graphite and coke in the friction material is preferably 4 to 15% by mass, more preferably 6 to 12% by mass, and further preferably 7 to 10% by mass based on the total amount of the friction material. When the total content of graphite and coke is equal to or more than the above lower limit value, high thermal conductivity tends to be obtained, and the abrasion performance at the time of high temperature tends to be good. When the total content of graphite and coke is equal to or less than the above upper limit value, the lubrication characteristics tend not to be too high, and the friction coefficient at the usual time tends to be good.

The graphite content in the friction material is preferably 1 to 12% by mass, more preferably 2 to 10% by mass, and further preferably 3 to 7% by mass based on the total amount of the friction material. When the graphite content is equal to or more than the above lower limit value, high thermal conduction tends to be obtained, and the abrasion performance at the time of high temperature tends to be good. When the graphite content is equal to or less than the above upper limit value, the lubrication characteristics tend not to be too high, and the friction coefficient at the usual time tends to be good.

The coke content in the friction material is preferably 1 to 12% by mass, more preferably 2 to 10% by mass, and further preferably 3 to 7% by mass based on the total amount of the friction material. When the coke content is equal to or more than the above lower limit value, high thermal conduction tends to be obtained, and the abrasion performance at the time of high temperature tends to be good. When the coke content is equal to or less than the above upper limit value, the lubrication characteristics are not too high, and the friction coefficient at the usual time can be made good.

Examples of the combination of the graphite and the coke constituting the above coarse-grained material and the above fine-grained material include the following modes:

(a) the mode in which the coarse-grained material of the carbon material comprises only graphite, and the fine-grained material comprises only coke (b) the mode in which the coarse-grained material of the carbon material comprises only graphite, and the fine-grained material comprises graphite and coke (c) the mode in which the coarse-grained material of the carbon material comprises graphite and coke, and the fine-grained material comprises only graphite (d) the mode in which the coarse-grained material of the carbon material comprises graphite and coke, and the fine-grained material comprises only coke (e) the mode in which the coarse-grained material of the carbon material comprises graphite and coke, and the fine-grained material comprises graphite and coke (f) the mode in which the coarse-grained material of the carbon material comprises only coke, and the fine-grained material comprises only graphite (g) the mode in which the coarse-grained material of the carbon material comprises only coke, and the fine-grained material comprises graphite and coke Considering graphite being better in lubrication performance than coke, coke being poorer in crystallinity but more inexpensive than graphite, and the abrasion resistance, thermal conductivity, price, and the like of the obtained friction material, the above modes (a) to (e) in which graphite is contained as the coarse-grained material are preferred, the above modes (a), (b), (d), and (e) in which graphite is contained as the coarse-grained material, and coke is contained as the fine-grained material are more preferred, the above modes (d) and (e) in which graphite and coke are contained as the coarse-grained material, and coke is contained as the fine-grained material are further preferred, and the above mode (d) in which graphite and coke are contained as the coarse-grained material, and only coke is contained as the fine-grained material is particularly preferred, for the friction material in this embodiment.

Also preferred for the friction material in this embodiment is a mode in which graphite and coke are contained as the coarse-grained material, coke is contained as the fine-grained material, the content of the coarse-grained material of the above graphite is 1 to 12% by mass based on the total amount of the friction material, the content of the coarse-grained material of the above coke is 1 to 12% by mass based on the total amount of the friction material, the content of the fine-grained material of the above coke is 1 to 12% by mass based on the total amount of the friction material, and the total content of the above graphite and the above coke is 4 to 15% by mass based on the total amount of the friction material.

The content of the coarse-grained material of graphite is more preferably 2 to 10% by mass, further preferably 3 to 7% by mass, based on the total amount of the friction material.

The content of the coarse-grained material of coke is more preferably 1 to 6% by mass, further preferably 2 to 4% by mass, based on the total amount of the friction material.

The content of the fine-grained material of coke is more preferably 1 to 6% by mass, further preferably 1.5 to 4% by mass, based on the total amount of the friction material.

The total content of the coarse-grained material of graphite, the coarse-grained material of coke, and the fine-grained material of coke is more preferably 6 to 12% by mass, further preferably 7 to 10% by mass.

For the graphite, graphite usually used for friction materials can be used. The graphite may be natural graphite or artificial graphite, and artificial graphite and natural graphite may be used in combination.

The types of coke include coal coke and petroleum coke. Either can be used, and these may be used in combination.

The shape of the graphite and the coke is not particularly limited, and examples thereof include a spherical shape, a plate shape, a columnar shape, a scaly shape, an irregular shape, and a shape having a structure. A carbon material having one shape among these, and a carbon material having a shape different from the above one shape may be mixed and used.

[Magnesium Oxide]

The friction material in this embodiment contains magnesium oxide together with the above carbon material.

Magnesium oxide has a Mohs hardness of about 6, and the Mohs hardness of cast iron, an opposite material, is 4, and therefore when the friction material in this embodiment contains magnesium oxide, the friction coefficient can be improved. In addition, magnesium oxide has high thermal conductivity as ceramic particles and therefore can make the thermal conductivity of the friction material good.

The magnesium oxide is not particularly limited, and generally used magnesium oxide can be used. The magnesium oxide may be either active magnesium oxide or electrofused magnesium oxide.

One magnesium oxide may be used alone, or two or more magnesium oxides may be used in combination.

The average particle diameter of the magnesium oxide is preferably 1 to 10 μm and is more preferably 2 to 5 μm.

The magnesium oxide content in the friction material is preferably 3 to 13% by mass, more preferably 3 to 10% by mass, and further preferably 4 to 7% by mass based on the total amount of the friction material. When the magnesium oxide content is equal to or more than the above lower limit value, a high friction coefficient and thermal conductivity tend to be obtained. When the magnesium oxide content is equal to or less than the above upper limit value, the aggressiveness toward an opposite material being too high can be avoided.

[Zinc Oxide]

The friction material in this embodiment preferably further contains zinc oxide.

Zinc oxide has high thermal conductivity as ceramic particles and therefore can make the thermal conductivity of the friction material good and can stabilize the friction coefficient during fade.

The zinc oxide may be generally used zinc oxide, and the shape is preferably particulate.

One zinc oxide may be used alone, or two or more zinc oxides may be used in combination.

The average particle diameter of the zinc oxide is preferably 0.1 to 3 μm.

The zinc oxide content in the friction material is preferably 2 to 10% by mass, more preferably 2 to 8% by mass, and further preferably 3 to 6% by mass based on the total amount of the friction material. When the zinc oxide content is equal to or more than the above lower limit value, the friction coefficient during fade tends to be made good. When the zinc oxide content is equal to or less than the above upper limit value, the abrasion during high speed braking tends to be made good.

The friction material in this embodiment may further contain inorganic fillers other than graphite, coke, magnesium oxide, and zinc oxide (hereinafter also referred to as "other inorganic fillers").

[Other Inorganic Fillers]

Other inorganic fillers are not particularly limited as long as they are inorganic fillers usually used for friction materials.

Examples of other inorganic fillers include tin sulfide, bismuth sulfide, molybdenum disulfide, iron sulfide, antimony trisulfide, zinc sulfide, calcium hydroxide, calcium oxide, sodium carbonate, barium sulfate, mica, vermiculite, calcium sulfate, talc, clay, zeolite, mullite, chromite, titanium oxide, silica, dolomite, calcium carbonate, magnesium carbonate, granular or plate-like titanates, zirconium silicate, γ-alumina, manganese dioxide, triiron tetroxide (iron oxide), cerium oxide, and zirconia. Examples of the granular or plate-like titanates include potassium hexatitanate, potassium octatitanate, lithium potassium titanate, magnesium potassium titanate, and sodium titanate.

Among these, tin sulfide, calcium hydroxide, barium sulfate, mica, titanates, iron oxide, iron sulfide, zirconia, zirconium silicate, and alumina are preferred.

The above inorganic fillers are contained as friction-adjusting materials added for avoiding the deterioration of the heat resistance of the friction material, and for improving the abrasion resistance, and for the purpose of improving the friction coefficient.

One of other inorganic fillers may be used alone, or two or more of other inorganic fillers may be used in combination.

Tin sulfide is contained as a lubricant.

The average particle diameter of tin sulfide is not particularly limited but is preferably 10 to 70 μm, more preferably 15 to 60 μm, and further preferably 20 to 50 μm.

When tin sulfide is contained as an inorganic filler, its content is preferably 1 to 8% by mass, more preferably 2 to 6% by mass, and further preferably 3 to 4% by mass based on the total amount of the friction material.

The average particle diameter of calcium hydroxide is not particularly limited but is preferably 1 to 70 μm, more preferably 3 to 60 μm, and further preferably 5 to 50 μm.

When calcium hydroxide is contained as an inorganic filler, its content is preferably 0.5 to 8% by mass, more preferably 1 to 6% by mass, and further preferably 2 to 4% by mass based on the total amount of the friction material.

The average particle diameter of barium sulfate is not particularly limited but is preferably 1 to 100 μm, more preferably 5 to 75 μm, and further preferably 10 to 50 μm.

When barium sulfate is contained as an inorganic filler, its content is preferably 4 to 30% by mass, more preferably 6 to 25% by mass, and further preferably 8 to 18% by mass based on the total amount of the friction material.

Barium sulfate serves as a simple filler for adjusting the volume of the friction material. In other words, the barium sulfate content depends on the content of other components, and the remainder for setting the amount of the friction material composition at a predetermined amount can be supplemented with barium sulfate.

The average particle diameter of mica is not particularly limited but is preferably 5 to 100 μm, more preferably 10 to 60 μm, and further preferably 12 to 20 μm.

When mica is contained as an inorganic filler, its content is preferably 2 to 15% by mass, more preferably 4 to 10% by mass, and further preferably 5 to 7% by mass based on the total amount of the friction material.

The average particle diameter of a titanate is not particularly limited but is preferably 1 to 50 μm, more preferably 1.5 to 40 μm, further preferably 2 to 20 μm, particularly preferably 2 to 10 μm, and most preferably 2 to 5 μm.

When a titanate is contained as an inorganic filler, its content is preferably 1 to 20% by mass, more preferably 5 to 15% by mass, and further preferably 8 to 12% by mass based on the total amount of the friction material.

The average particle diameter of iron oxide is not particularly limited but is preferably 0.1 to 10 μm, more preferably 0.15 to 5 μm, and further preferably 0.2 to 3 μm.

When iron oxide is contained as an inorganic filler, its content is preferably 2 to 20% by mass, more preferably 5 to 15% by mass, and further preferably 7 to 10% by mass based on the total amount of the friction material.

The average particle diameter of iron sulfide is not particularly limited but is preferably 1 to 100 μm, more preferably 5 to 70 μm, and further preferably 10 to 40 μm.

When iron sulfide is contained as an inorganic filler, its content is preferably 0.5 to 10% by mass, more preferably 1 to 7% by mass, and further preferably 2 to 5% by mass based on the total amount of the friction material.

Zirconia is contained as a grinding material.

The average particle diameter of zirconia is not particularly limited but is preferably 0.1 to 15 μm, more preferably 0.5 to 10 μm, and further preferably 1 to 5 μm.

When zirconia is contained as an inorganic filler, its content is preferably 1 to 25% by mass, more preferably 5 to 20% by mass, and further preferably 10 to 14% by mass based on the total amount of the friction material.

Zirconium silicate is contained as a grinding material.

The average particle diameter of zirconium silicate is not particularly limited but is preferably 0.2 to 2 μm, more preferably 0.3 to 2 μm, and further preferably 0.4 to 2 μm.

When zirconium silicate is contained as an inorganic filler, its content is preferably 0.2 to 10% by mass, more preferably 0.5 to 5% by mass, and further preferably 1 to 3% by mass based on the total amount of the friction material.

Alumina is contained as a grinding material.

The average particle diameter of alumina is not particularly limited but is preferably 2 to 300 μm, more preferably 5 to 250 μm, and further preferably 10 to 200 μm.

When alumina is contained as an inorganic filler, its content is preferably 0.2 to 10% by mass, more preferably 0.5 to 6% by mass, and further preferably 1 to 4% by mass based on the total amount of the friction material.

The total content of the inorganic fillers in the friction material in this embodiment is preferably 30 to 80% by mass, more preferably 40 to 70% by mass, and particularly preferably 50 to 60% by mass. When the total content of the inorganic fillers is within the above range, the deterioration of the heat resistance can be avoided, and the balance of the content of other components of the friction material is excellent.

The friction material in this embodiment preferably further contains one or more selected from the group consisting of a binder, an organic filler, and a fiber substrate.

(Binder)

The binder integrates the organic fillers, the inorganic fillers, the fiber substrate, and the like contained in the friction material, to provide strength.

The binder contained in the friction material in this embodiment is not particularly limited, and thermosetting resins usually used as the binders of friction materials can be used.

Examples of the thermosetting resins include (1) phenolic resins, (2) various elastomer-dispersed phenolic resins such as acrylic elastomer-dispersed phenolic resins and silicone elastomer-dispersed phenolic resins, and (3) various modified phenolic resins such as acrylic-modified phenolic resins, silicone-modified phenolic resins, cashew-modified phenolic resins, epoxy-modified phenolic resins, and alkylbenzene-modified phenolic resins. Among these, particularly, phenolic resins, acrylic-modified phenolic resins, silicone-modified phenolic resins, and alkylbenzene-modified phenolic resins are preferred because they provide good heat resistance, good moldability, and a good friction coefficient.

One binder may be used alone, or two or more binders may be used in combination.

The binder content in the friction material in this embodiment is preferably 5 to 20% by mass, more preferably 6 to 15% by mass, and further preferably 7 to 10% by mass based on the total amount of the friction material. When the binder content is within the above range, a decrease in the strength of the friction material tends to be further suppressed, and the deterioration of the sound and vibration performance, such as squeal, due to a decrease in the porosity of the friction material and an increase in the elastic modulus tends to be further suppressed.

(Organic Filler)

The organic filler is contained as a friction-adjusting material for improving the sound and vibration performance, abrasion resistance, and the like of the friction material.

The organic filler contained in the friction material in this embodiment is not particularly limited as long as it can exhibit the above performance. Cashew dust, rubber components, and the like usually used as organic fillers can be used.

Here, in this embodiment, the organic filler does not include one having a fibrous shape (for example, the organic fibers described later).

One organic filler may be used alone, or two or more organic fillers may be used in combination.

The cashew dust should be cashew dust usually used for friction materials, obtained by pulverizing a cured product of cashew nutshell oil. The cashew dust is preferably unmodified cashew dust.

The average particle diameter of the cashew dust is not particularly limited but is preferably 50 to 600 μm, more preferably 70 to 520 μm, further preferably 100 to 550 μm, and particularly preferably 150 to 500 μm.

When the friction material contains cashew dust, its content is preferably 0.5 to 10% by mass, more preferably 1 to 7% by mass, and further preferably 2 to 5% by mass based on the total amount of the friction material. When the cashew dust content is equal to or more than the above lower limit value, moderate flexibility can be provided to the friction material, and therefore the sound and vibration properties tend to be improved. When the cashew dust content is equal to or less than the above upper limit value, decreases in heat resistance and crack resistance tend to be suppressed.

Examples of the above rubber components include acrylic rubber, isoprene rubber, NBR (nitrile butadiene rubber), SBR (styrene butadiene rubber), chlorinated butyl rubber, butyl rubber, silicone rubber, and tire rubber obtained by shredding old tires (tire tread rubber).

When the friction material contains rubber, its content is preferably 0.5 to 10% by mass, more preferably 0.7 to 5% by mass, and further preferably 1 to 3% by mass based on the total amount of the friction material. When the rubber content is within the above range, an increase in the elastic modulus of the friction material, and the deterioration of the vibration damping properties, such as squeal, tend to be avoided, and the deterioration of the heat resistance, and strength decrease due to a thermal history tend to be avoided.

The friction material in this embodiment preferably contains one or more selected from the group consisting of cashew dust and a rubber component, and more preferably, cashew dust and a rubber component are used in combination. When cashew dust and a rubber component are used in combination, cashew dust coated with a rubber component may be used, or cashew dust and a rubber component may be separately blended from the viewpoint of sound and vibration performance.

The total content of the organic filler in the friction material in this embodiment is preferably 1 to 20% by mass, more preferably 2 to 15% by mass, and further preferably 3 to 8% by mass. When the total content of the organic filler is within the above range, an increase in the elastic modulus of the friction material, and the deterioration of the sound and vibration performance, such as squeal, tend to be avoided, and the deterioration of the heat resistance, and strength decrease due to a thermal history tend to be avoided.

(Fiber Substrate)

The fiber substrate exhibits reinforcing action in the friction material.

Examples of the fiber substrate include inorganic fibers, metal fibers, organic fibers, and carbon-based fibers.

One fiber substrate may be used alone, or two or more fiber substrates may be used in combination.

—Inorganic Fibers—

Examples of the inorganic fibers include ceramic fibers, biodegradable ceramic fibers, mineral fibers, glass fibers, and silicate fibers. Among these, mineral fibers are preferred, and biosoluble mineral fibers containing $SiO_2$, $Al_2O_3$, CaO, MgO, FeO, $Na_2O$, and the like in any combination are more preferred.

The biosoluble mineral fibers here are mineral fibers characterized by being partially decomposed and eliminated from the body in a short time even when taken into the human body. Specifically, the biosoluble mineral fibers refer to fibers in which for the chemical composition, the total amount of alkali oxides and alkaline earth oxides (the total amount of oxides of sodium, potassium, calcium, magnesium, and barium) is 18% by mass or more and which satisfy any of (a) the half-life of fibers having a length of more than 20 μm being less than 10 days in a biopersistence test by short-term inhalation exposure, (b) the half-life of fibers having a length of more than 20 μm being less than 40 days in a biopersistence test by short-term intratracheal instillation, (c) the absence of significant carcinogenicity in an intraperitoneal administration test, or (d) the absence of carcinogenicity-related pathological findings or tumorigenesis in a long-term inhalation exposure test (see Nota Q of EU Directive 97/69/EC (exclusion from the application of carcinogenicity)). Examples of such biodegradable mineral fibers include $SiO_2$—$Al_2O_3$—CaO—MgO—FeO(—$K_2O$—$Na_2O$)-based fibers and include mineral fibers containing, in any combination, at least two selected from the group consisting of $SiO_2$, $Al_2O_3$, CaO, MgO, FeO, $K_2O$, $Na_2O$, and the like.

When the friction material contains mineral fibers, its content is preferably 1 to 20% by mass, more preferably 2 to 10% by mass, and further preferably 3 to 7% by mass based on the total amount of the friction material.

When the friction material contains inorganic fibers, their total content is preferably 1 to 20% by mass, more preferably 2 to 10% by mass, and further preferably 3 to 7% by mass based on the total amount of the friction material.

—Metal Fibers—

Examples of the metal fibers include fibers comprising a metal or an alloy of aluminum, iron, cast iron, zinc, tin, titanium, nickel, magnesium, silicon, copper, brass, or the like as a main component.

—Organic Fibers—

Examples of the organic fibers include aramid fibers, cellulose fibers, acrylic fibers, and phenolic resin fibers.

When the friction material contains organic fibers, their total content is preferably 0.5 to 10% by mass, more preferably 1 to 7% by mass, and further preferably 1.5 to 3% by mass based on the total amount of the friction material. When the total content of the organic fibers is equal to or more than the above lower limit value, good shear strength, crack resistance, and abrasion resistance tend to be exhibited. When the total content of the organic fibers is equal to or less than the above upper limit value, the deterioration of the shear strength and the crack resistance due to the uneven distribution of the organic fibers and other materials in the friction material tends to be effectively suppressed.

—Carbon-Based Fibers—

Examples of the carbon-based fibers include flame-resistant fibers, pitch-based carbon fibers, PAN-based carbon fibers, and activated carbon fibers.

The total content of the fiber substrate in the friction material in this embodiment is preferably 2 to 40% by mass, more preferably 4 to 20% by mass, further preferably 5 to 15% by mass, and particularly preferably 6 to 10% by mass based on the total amount of the friction material. When the total content of the fiber substrate is within the above range, an optimal porosity as the friction material is obtained, and therefore squeal tends to be prevented, and appropriate material strength, excellent abrasion resistance, and good moldability tend to be obtained.

(Other Components)

The friction material in this embodiment may contain other materials other than the above components, as needed.

Examples of other materials include metal powders such as zinc powders and aluminum powders; and organic additives such as fluorine-based polymers such as polytetrafluoroethylene (PTFE), from the viewpoint of the improvement of the abrasion resistance and the thermal fade characteristics.

When the friction material in this embodiment contains the above other materials, the content of each of them is preferably 5% by mass or less, more preferably 3% by mass or less, based on the total amount of the friction material. The friction material need not contain other materials.

(Method for Producing Friction Material)

The friction material in this embodiment can be produced, for example, by molding the friction material composition in this embodiment described later by a generally used method, and is preferably produced by hot press molding. Particularly, the friction material in this embodiment is produced, for example, by uniformly mixing the friction material composition of in this embodiment using a mixing machine such as a Loedige mixer ("Loedige" is a registered trademark), a pressure kneader, or an EIRICH mixer ("EIRICH" is a registered trademark), premolding this mixture in a molding die, molding the obtained premolded material, for example, under the conditions of a molding temperature of 130 to 160° C., a molding pressure of 20 to 50 MPa, and a molding time of 2 to 10 min, and heat-treating the obtained molded material, for example, at 150 to 250° C. for 2 to 10 h. Further, painting, scorching treatment, polishing treatment, and the like may be performed as needed. Among the above steps, the premolding step may be omitted to directly thermally mold the mixture.

<Back Metal>

The back metal is one usually used as a friction member for the improvement of the mechanical strength of the friction member, and examples of the material include metals such as iron and stainless steel; and fiber-reinforced plastics such as inorganic fiber-reinforced plastics and carbon fiber-reinforced plastics.

The friction member in this embodiment may have a configuration in which a primer layer intended for surface modification for increasing the adhesive effect of the back metal, and an adhesive layer intended for the adhesion between the back metal and the friction material are further interposed between the back metal and the friction material. The primer layer and the adhesive layer should be those usually used for friction members such as brake shoes.

[Vehicle]

The vehicle in this embodiment is a vehicle equipped with the friction member in this embodiment.

Examples of the vehicle in this embodiment include vehicles in which the friction member in this embodiment is used for disk brake pads, brake linings, clutch facings, electromagnetic brakes, holding brakes, and the like. Examples of the vehicle include motor vehicles such as large-sized motor vehicles, medium-sized motor vehicles, ordinary motor vehicles, large-sized special motor vehicles, small-sized special motor vehicles, large-sized motorcycles, and ordinary motorcycles.

As the vehicle equipped with the friction member in this embodiment, passenger vehicles such as electric vehicles and hybrid vehicles, equipped with regenerative brake systems are particularly preferred because excellent rust removal properties can be exhibited even in braking at a low load.

[Friction Material Composition in First Implementation and Method for Producing the Same, and Friction Material Using Friction Material Composition]

A friction material composition in a first implementation is a friction material composition containing no copper, or having a copper content of less than 0.5% by mass in terms of a copper element even if the friction material composition contains copper, wherein the friction material composition contains magnesium oxide and a carbon material comprising graphite and coke, the carbon material is obtained by blending in a combination of a coarse-grained material and a fine-grained material, the average particle diameter of the coarse-grained material is 100 to 600 µm, and the average particle diameter of the fine-grained material is less than 100 µm.

The description of the components contained in the friction material composition in the first implementation is the same as the description of the components contained in the friction material of the friction member in this embodiment described above except the changes in the chemical states of the curable resin and the like. For example, the content of each component in the friction material based on the total amount of the friction material described above can be read as the content of each component in the friction material composition based on the total amount of the friction material composition.

The friction material composition in the first implementation is excellent in thermal conductivity, abrasion resistance, and friction coefficient and therefore particularly useful as the overlay material of a disk brake pad, a brake lining, or the like of a motor vehicle or the like, but can also be molded and used as the underlay material of a friction member. The "overlay material" is a friction material forming the friction surface of a friction member, and the "underlay material" is a layer interposed between a friction material forming the friction surface of a friction member and a back metal and intended for the improvement of the shear strength and the crack resistance around the adhesion portion between the friction material and the back metal, and the like.

The friction material composition in the first implementation can be produced by a method comprising the step of mixing the above-described magnesium oxide, graphite, and coke. Specifically, the friction material composition in the first implementation can be produced by mixing the above-described magnesium oxide, graphite, and coke, and components used as needed, using a known mixer or the like.

The present invention also provides a friction material containing the friction material composition in the first implementation.

Preferred modes of the friction material containing the friction material composition in the first implementation, and a method for producing the friction material are described similarly to the description of the friction material in the friction member in this embodiment described above.

[Friction Material Composition in Second Implementation, Friction Material Using Friction Material Composition, Friction Member, and Vehicle]

The present invention also provides the following friction material composition in a second implementation.

The friction material composition in the second implementation contains no copper, or has a copper content of less than 0.5% by mass in terms of a copper element even if the friction material composition contains copper, the friction material composition contains magnesium oxide and a carbon material comprising graphite and coke, the carbon material has two or more peaks in the particle diameter distribution curve showing the volume-based frequency distribution, and the two or more peaks include a first peak having a maximum in the range of 100 to 600 µm, and a second peak having a maximum in the range of less than 100 µm.

The friction material composition in the second implementation will be described in detail below.

<Carbon Material>

The carbon material contained in the friction material composition in the second implementation has two or more peaks in the particle diameter distribution curve showing the volume-based frequency distribution.

In this embodiment, the particle diameter distribution curve showing the volume-based frequency distribution for the carbon material is measured, for example, by the following methods.

(1) Case where Carbon Material is Powdery

Measurement can be performed by the same method as the average particle diameter of the carbon material described above.

(2) Case where Carbon Material is in State of being Contained in Friction Material A cross section formed by cutting a friction material is observed using a scanning electron microscope, the particle diameters (equivalent circle diameters) of 1000 particles arbitrarily selected in this cross section observation are measured, and the volume-based particle diameter distribution curve plotted with the particle diameter on the horizontal axis and the abundance ratio of the particles on the vertical axis is obtained.

For the carbon material, the number of peaks in the particle diameter distribution curve showing the volume-based frequency distribution (a simple "peak" or simple "peaks" hereinafter means a peak or peaks in the particle diameter distribution curve showing the volume-based frequency distribution) should be two or more and is preferably two. However, the number of peaks may be three or more, or four or more, and may be six or less, or five or less, according to the desired performance.

The carbon material has two or more peaks in the particle diameter distribution curve showing the volume-based frequency distribution described above, and the two or more peaks include a first peak having a maximum in the range of 100 to 600 µm, and a second peak having a maximum in the range of less than 100 µm.

The range of the maximum of the above first peak is preferably 100 to 550 µm, more preferably 150 to 500 µm, further preferably 200 to 450 µm, and particularly preferably 250 to 400 µm from the viewpoint of providing high thermal conductivity and excellent abrasion resistance to the friction material.

The range of the maximum of the above second peak is preferably less than 90 µm, more preferably less than 50 µm, further preferably less than 30 µm, and particularly preferably less than 10 µm from the viewpoint of providing high thermal conductivity and excellent abrasion resistance to the friction material. The range of the maximum of the second peak may be 1 µm or more, or 2 µm or more.

When the carbon material has only two peaks, one of the peaks has a maximum in the range of the maximum of the first peak described above, and the other of the peaks has a maximum in the range of the maximum of the second peak described above.

When the carbon material has three or more peaks, at least one peak has a maximum in the range of the maximum of the first peak described above, and at least one peak has a maximum in the range of the maximum of the second peak described above. The carbon material may have a peak in a range other than the range of the maximum of the first peak described above, and the range of the maximum of the second peak described above, but need not have such a peak.

The material, shape, content, and the like of the carbon material are described similarly to the description of the carbon material contained in the friction material of the friction member in this embodiment described above.

Further, one or more selected from the group consisting of a binder, an organic filler, an inorganic filler other than a carbon material, and a fiber substrate may be blended into the friction material composition in the second implementation. The description of the binder, the organic filler, the inorganic filler, and the fiber substrate is described similarly to the description of these contained in the friction material of the friction member in this embodiment described above.

The present invention also provides a friction material obtained by molding the friction material composition in the second implementation. Further, the present invention also provides a friction member having the friction material and a back metal in this order, and a vehicle equipped with the friction member.

A method for producing the friction material, the members constituting the friction member and a production method, and preferred modes of the vehicle are described similarly to the description for the friction member in this embodiment and the vehicle equipped with the friction member described above.

EXAMPLES

The friction material composition, friction material, and friction member of the present invention will be described in more detail below using Examples and Comparative Examples, but the present invention is not limited to these in any way.

Examples 1 to 13 and Comparative Examples 1 to 3

[Fabrication of Disk Brake Pad]

Materials were blended according to a blending ratio (unit: % by mass) shown in Tables 1 to 3, to obtain each friction material composition.

Next, this friction material composition was mixed by a Loedige mixer (manufactured by MATSUBO Corporation, trade name: Loedige Mixer M20), this mixture was pre-molded by a molding press (manufactured by Oji Machine Co., Ltd.), and the obtained premolded material was hot press-molded together with a steel back metal under the conditions of a molding temperature of 150° C. and a molding pressure of 30 MPa for 5 min using a molding press (manufactured by SANKI SEIKO CO., LTD.). The obtained molded article was heat-treated at 200° C. for 4.5 h, polished using a rotary polishing machine, and subjected to scorching treatment at 500° C. to obtain a disk brake pad (thickness of friction material: 11 mm, projected area of friction material: 52 cm$^2$).

The details of the carbon materials and magnesium oxide used in the Examples and the Comparative Examples are as follows. The various materials used in the Examples and the Comparative Examples were the same ones.

Coarse-grained material of graphite: average particle diameter 350 μm
Coarse-grained material of coke: average particle diameter 300 μm
Fine-grained material of graphite: average particle diameter 8 μm
Fine-grained material of coke: average particle diameter 30 μm
Magnesium oxide: average particle diameter 3 μm

[Evaluation Methods]

The disk brake pad fabricated in each example was evaluated by the following methods. The results are shown in Tables 1 to 3.

(Thermal Conductivity)

The thermal conductivity of the friction material surface of the brake pad was measured by a probe method using Kemtherm QTM-D3 manufactured by Kyoto Electronics Manufacturing Co., Ltd., and evaluated based on the following evaluation criteria:
A: 1.1 W/(m·K) or more
B: 1.0 W/(m·K) or more and less than 1.1 W/(m·K)
C: less than 1.0 W/(m·K)

(Friction Coefficients)

The friction coefficients were measured based on JASO C406, a standard by the Society of Automotive Engineers of Japan, Inc., and the average value of the friction coefficients at a vehicle speed of 130 km/h and a deceleration of 0.3 G in the second effectiveness test was evaluated. The evaluation of the above abrasion resistance and friction coefficients was performed at an inertia of 7 kgf·m·sec$^2$ using a dynamometer. It was carried out using a ventilated disk rotor (manufactured by KIRIU CORPORATION, material: FC190) and a general pin-sliding collet type caliper. In this test, the average of the friction coefficients measured in a total of 15 brakings in the second fade test was obtained as the "average friction coefficient", and the minimum friction coefficient (Min of Min) was obtained as the "minimum friction coefficient", and they were evaluated based on the following evaluation criteria:

[Average Friction Coefficient]
A: 0.43 or more
B: 0.40 or more and less than 0.43
C: less than 0.40

[Minimum Friction Coefficient]
A: 0.23 or more
B: 0.20 or more and less than 0.23
C: less than 0.20

(Amount of Abrasion at 300° C.)

The amount of abrasion of the friction material corresponding to 1000 brakings at a brake temperature of 300° C., a vehicle speed of 60 km/h, and a deceleration of 0.3 G was measured, and evaluated based on the following evaluation criteria:
A: less than 0.6 mm
B: 0.6 mm or more and less than 0.9 mm
C: 0.9 mm or more

TABLE 1

|  |  | Examples | | | | | | |
|---|---|---|---|---|---|---|---|---|
|  |  | 1 | 2 | 3 | 4 | 5 | 6 | 7 |
| Binder | Phenolic resin | 9.0 | 9.0 | 9.0 | 9.0 | 9.0 | 9.0 | 9.0 |
| Fiber substrates | Aramid resin | 2.0 | 2.0 | 2.0 | 2.0 | 2.0 | 2.0 | 2.0 |
|  | Mineral fibers | 5.0 | 5.0 | 5.0 | 5.0 | 5.0 | 5.0 | 5.0 |
| Organic fillers | Cashew dust | 3.0 | 3.0 | 3.0 | 3.0 | 3.0 | 3.0 | 3.0 |
|  | Butyl rubber | 1.5 | 1.5 | 1.5 | 1.5 | 1.5 | 1.5 | 1.5 |
| Inorganic fillers | Calcium hydroxide | 3.0 | 3.0 | 3.0 | 3.0 | 3.0 | 3.0 | 3.0 |
|  | Barium sulfate | 14.5 | 14.5 | 17.5 | 17.5 | 18.0 | 18.0 | 12.5 |
|  | Titanate | 10.0 | 10.0 | 10.0 | 10.0 | 10.0 | 10.0 | 10.0 |
|  | Mica | 6.0 | 6.0 | 6.0 | 6.0 | 6.0 | 6.0 | 6.0 |
|  | Zinc oxide |  |  |  |  |  |  |  |
|  | Iron oxide | 9.0 | 9.0 | 9.0 |  | 7.5 | 7.5 | 9.0 |
|  | Iron sulfide |  |  |  |  |  |  | 2.0 |
|  | Magnesium oxide | 7.0 | 7.0 | 7.0 | 13.0 | 5.0 | 5.0 | 7.0 |
|  | Zirconia | 12.0 | 12.0 | 12.0 | 12.0 | 12.0 | 12.0 | 12.0 |
|  | Zirconium silicate | 2.0 | 2.0 | 2.0 | 2.0 | 2.0 | 2.0 | 2.0 |
|  | γ-Alumina | 3.0 | 3.0 |  | 3.0 | 3.0 | 3.0 | 3.0 |

TABLE 1-continued

|  |  |  | Examples |  |  |  |  |  |  |
|---|---|---|---|---|---|---|---|---|---|
|  |  |  | 1 | 2 | 3 | 4 | 5 | 6 | 7 |
|  | Carbon materials (coarse-grained materials) | Graphite | 5.0 |  |  | 5.0 | 5.0 | 2.5 | 5.0 |
|  |  | Coke | 2.5 | 2.5 | 2.5 | 2.5 | 2.5 | 2.5 | 2.5 |
|  | Carbon materials (fine-grained materials) | Graphite |  | 5.0 | 5.0 |  |  | 2.5 |  |
|  |  | Coke | 2.0 | 2.0 | 2.0 | 2.0 | 2.0 | 2.0 | 2.0 |
|  | Tin sulfide |  | 3.5 | 3.5 | 3.5 | 3.5 | 3.5 | 3.5 | 3.5 |
| Total |  |  | 100 | 100 | 100 | 100 | 100 | 100 | 100 |
| Thermal conductivity | Thermal conductivity W/(m·K) |  | B | B | B | B | B | B | B |
| Friction coefficients | Average friction coefficient |  | A | B | B | A | A | B | A |
|  | Minimum friction coefficient (Min of Min) |  | A | B | B | B | B | B | B |
| Abrasion resistance | Amount of abrasion at 300° C. (mm) |  | A | B | A | B | A | B | B |

TABLE 2

|  |  |  | Examples |  |  |  |  |  |
|---|---|---|---|---|---|---|---|---|
|  |  |  | 8 | 9 | 10 | 11 | 12 | 13 |
| Binder | Phenolic resin |  | 9.0 | 9.0 | 9.0 | 9.0 | 9.0 | 9.0 |
| Fiber substrates | Aramid fibers |  | 2.0 | 2.0 | 2.0 | 2.0 | 2.0 | 2.0 |
|  | Mineral fibers |  | 5.0 | 5.0 | 5.0 | 5.0 | 5.0 | 5.0 |
| Organic fillers | Cashew dust |  | 3.0 | 3.0 | 3.0 | 3.0 | 3.0 | 3.0 |
|  | Butyl rubber |  | 1.5 | 1.5 | 1.5 | 1.5 | 1.5 | 1.5 |
| Inorganic fillers | Calcium hydroxide |  | 3.0 | 3.0 | 3.0 | 3.0 | 3.0 | 3.0 |
|  | Barium sulfate |  | 11.0 | 14.0 | 8.0 | 14.0 | 18.0 | 16.0 |
|  | Titanate |  | 10.0 | 10.0 | 10.0 | 10.0 | 10.0 | 10.0 |
|  | Mica |  | 6.0 | 6.0 | 6.0 | 6.0 | 6.0 | 6.0 |
|  | Zinc oxide |  |  |  | 10.0 | 4.0 |  |  |
|  | Iron oxide |  | 9.0 | 7.5 | 9.0 | 9.0 | 9.0 | 9.0 |
|  | Iron sulfide |  | 3.5 | 5.0 |  |  |  |  |
|  | Magnesium oxide |  | 7.0 | 4.0 | 7.0 | 7.0 | 7.0 | 7.0 |
|  | Zirconia |  | 12.0 | 12.0 | 12.0 | 12.0 | 12.0 | 12.0 |
|  | Zirconium silicate |  | 2.0 | 2.0 | 2.0 | 2.0 | 2.0 | 2.0 |
|  | γ-Alumina |  | 3.0 | 3.0 | 3.0 | 3.0 | 3.0 | 1.5 |
|  | Carbon materials (coarse-grained materials) | Graphite | 5.0 | 5.0 | 5.0 | 5.0 | 5.0 | 5.0 |
|  |  | Coke | 2.5 | 2.5 | 2.5 | 2.5 | 2.5 | 2.5 |
|  | Carbon materials (fine-grained materials) | Graphite |  |  |  |  |  |  |
|  |  | Coke | 2.0 | 2.0 | 2.0 | 2.0 | 2.0 | 2.0 |
|  | Tin sulfide |  | 3.5 | 3.5 |  |  |  | 3.5 |
| Total |  |  | 100 | 100 | 100 | 100 | 100 | 100 |
| Thermal conductivity | Thermal conductivity W/(m·K) |  | A | B | B | B | B | B |
| Friction coefficients | Average friction coefficient |  | A | A | B | B | B | B |
|  | Minimum friction coefficient (Min of Min) |  | B | A | A | A | B | B |
| Abrasion resistance | Amount of abrasion at 300° C. (mm) |  | B | B | B | A | B | A |

TABLE 3

|  |  | Comparative Examples |  |  |
|---|---|---|---|---|
|  |  | 1 | 2 | 3 |
| Binder | Phenolic resin | 9.0 | 9.0 | 9.0 |
| Fiber substrates | Aramid resin | 2.0 | 2.0 | 2.0 |
|  | Mineral fibers | 5.0 | 5.0 | 5.0 |
| Organic fillers | Cashew dust | 3.0 | 3.0 | 3.0 |
|  | Butyl rubber | 1.5 | 1.5 | 1.5 |
| Inorganic fillers | Calcium hydroxide | 3.0 | 3.0 | 3.0 |
|  | Barium sulfate | 30.5 | 14.5 | 14.5 |
|  | Titanate | 10.0 | 10.0 | 10.0 |
|  | Mica | 6.0 | 6.0 | 6.0 |
|  | Zinc oxide |  |  |  |
|  | Iron oxide |  | 9.0 | 9.0 |
|  | Iron sulfide |  |  |  |
|  | Magnesium oxide |  | 7.0 | 7.0 |
|  | Zirconia | 12.0 | 12.0 | 12.0 |
|  | Zirconium silicate | 2.0 | 2.0 | 2.0 |
|  | γ-Alumina | 3.0 | 3.0 | 3.0 |

TABLE 3-continued

|  |  | Comparative Examples | | |
|---|---|---|---|---|
|  |  | 1 | 2 | 3 |
|  | Carbon materials (coarse-grained materials) Graphite | 5.0 | 5.0 |  |
|  | Carbon materials (coarse-grained materials) Coke | 2.5 | 4.5 |  |
|  | Carbon materials (fine-grained materials) Graphite |  |  | 5.0 |
|  | Carbon materials (fine-grained materials) Coke | 2.0 |  | 4.5 |
|  | Tin sulfide | 3.5 | 3.5 | 3.5 |
| Total |  | 100 | 100 | 100 |
| Thermal conductivity | Thermal conductivity W/(m · K) | C | C | A |
| Friction coefficients | Average friction coefficient | C | A | B |
| Friction coefficients | Minimum friction coefficient (Min of Min) | C | A | C |
| Abrasion resistance | Amount of abrasion at 300° C. (mm) | A | A | C |

From Tables 1 to 3, the friction materials in this embodiment all have high thermal conductivity and exhibit stable friction coefficients, and further the amount of abrasion is also small. In contrast to this, the friction material of Comparative Example 1 containing no magnesium oxide has low friction coefficients, and the effectiveness of the brake is poor. For the friction material of Comparative Example 3 containing no graphite or coke that was a coarse-grained material, the amount of abrasion was large, and the abrasion resistance was poor. The friction material of Comparative Example 2 containing no graphite or coke that was a fine-grained material had low thermal conductivity. Separate examination was performed, and only with graphite and coke that were coarse-grained materials, the difference in the exhibited lubricating action was large, and the variations in the friction coefficients were large, depending on the braking conditions.

INDUSTRIAL APPLICABILITY

The friction material composition of the present invention can provide a friction material that has high thermal conductivity, is excellent in abrasion resistance during high temperature braking, and ensures a good friction coefficient during fade, even in a composition in which the friction material contains no copper suspected to be environmentally harmful, or has a copper content of less than 0.5% by mass in terms of a copper element even if the friction material contains copper, compared with conventional products. Therefore, the friction material composition, friction material, and friction member of the present invention are preferred for passenger vehicles and the like.

The invention claimed is:

1. A friction member comprising a friction material and a back metal, wherein
the friction material comprises no copper, or has a copper content of less than 0.5% by mass in terms of a copper element even if the friction material comprises copper,
the friction material comprises magnesium oxide and a carbon material comprising graphite and coke,
the carbon material is obtained by blending in a combination of a coarse-grained material and a fine-grained material,
the friction material comprises the graphite and the coke as the coarse-grained material, and comprises the coke as the fine-grained material,
an average particle diameter of the coarse-grained material is 100 to 600 μm, and
an average particle diameter of the fine-grained material is less than 100 μm,
a content of the coarse-grained material of the graphite is 1 to 12% by mass based on a total amount of the friction material,
a content of the coarse-grained material of the coke is 1 to 12% by mass based on the total amount of the friction material,
a content of the fine-grained material of the coke is 1 to 12% by mass based on the total amount of the friction material, and
a total content of the graphite and the coke is 4 to 15% by mass based on the total amount of the friction material.

2. The friction member according to claim 1, wherein a content ratio of the coarse-grained material to the fine-grained material [coarse-grained material/fine-grained material] in the friction material is 10/90 to 95/5 on a mass basis.

3. The friction member according to claim 1, wherein the friction material comprises the graphite as the coarse-grained material comprises the coke as the fine grained material.

4. The friction member according to claim 1, wherein a content of the magnesium oxide in the friction material is 3 to 13% by mass based on a total amount of the friction material.

5. The friction member according to claim 1, wherein the friction material further comprises 2 to 10% by mass of zinc oxide based on a total amount of the friction material.

6. A vehicle equipped with the friction member according to claim 1.

7. A friction material composition comprising no copper, or having a copper content of less than 0.5% by mass in terms of a copper element even if the friction material composition comprises copper, wherein
the friction material composition comprises magnesium oxide and a carbon material comprising graphite and coke,
the carbon material is obtained by blending in a combination of a coarse-grained material and a fine-grained material,
the friction material composition comprises the graphite and the coke as the coarse-grained material, and comprises the coke as the fine-grained material,
an average particle diameter of the coarse-grained material is 100 to 600 μm, and
an average particle diameter of the fine-grained material is less than 100 μm,.
a content of the coarse-grained material of the graphite is 1 to 12% by mass based on a total amount of the friction material composition,
a content of the coarse-grained material of the coke is 1 to 12% by mass based on the total amount of the friction material composition,
a content of the fine-grained material of the coke is 1 to 12% by mass based on the total amount of the friction material composition, and
a total content of the graphite and the coke is 4 to 15% by mass based on the total amount of the friction material composition.

8. The friction material composition according to claim 7, wherein a content ratio of the coarse-grained material to the fine-grained material [coarse-grained material/fine-grained material] is 10/90 to 95/5 on a mass basis.

9. The friction material composition according to claim 7, comprising the graphite as the coarse-grained material.

10. The friction material composition according to claim 7, wherein a content of the magnesium oxide is 3 to 13% by mass based on a total amount of the friction material composition.

11. The friction material composition according to claim 7, further comprising 2 to 10% by mass of zinc oxide based on a total amount of the friction material composition.

12. A friction material comprising the friction material composition according to claim 7.

* * * * *